United States Patent [19]

Frith

[11] Patent Number: 4,538,352
[45] Date of Patent: Sep. 3, 1985

[54] SHRINKAGE COMPENSATED MEASURING DEVICE

[76] Inventor: Donald E. Frith, 1109 W. Clark St., Champaign, Ill. 61820

[21] Appl. No.: 554,204

[22] Filed: Nov. 22, 1983

[51] Int. Cl.³ .............................................. G01B 3/04
[52] U.S. Cl. ...................................... 33/1 B; 33/476; 235/61 B; 235/89 R
[58] Field of Search ................ 33/1 B, 1 C, 1 F, 494, 33/476; 235/61 B, 89 R

[56] References Cited

U.S. PATENT DOCUMENTS

| | | |
|---|---|---|
| 503,528 | 8/1893 | Cowley ................................. 33/494 |
| 1,423,493 | 7/1922 | Clark ................................. 235/61 B |
| 1,930,478 | 10/1933 | Jones ................................. 235/61 B |
| 1,986,506 | 1/1935 | Harris . |
| 2,530,955 | 11/1950 | Gerber . |
| 2,561,020 | 7/1951 | Gerber . |
| 3,262,209 | 7/1966 | Saponaro . |
| 3,482,319 | 12/1969 | Carey . |
| 4,129,947 | 12/1978 | Brown, Jr. . |
| 4,159,571 | 7/1979 | Jervis . |
| 4,336,653 | 6/1982 | Stanton . |

FOREIGN PATENT DOCUMENTS

| | | |
|---|---|---|
| 26202 | 10/1906 | Austria . |
| 0114901 | 9/1980 | Japan . |
| 273116 | 4/1951 | Switzerland . |

OTHER PUBLICATIONS

Wulff, J. et al., Metallurgy for Engineers: Casting, Welding and Working, John Wiley & Sons, New York, 1952, pp. 270-272.

Advertising Material for a Shrink Rule, Creative Industries, 5366 Jackson Drive, LaMesa, California, 92041, (no date).

Primary Examiner—William D. Martin, Jr.
Attorney, Agent, or Firm—Leydig, Voit and Mayer

[57] ABSTRACT

The disclosure describes a shrinkage compensated measuring device comprising a first scale calibrated in units of length, e.g., inches or centimeters, and a second scale calibrated in units of percent shrinkage. Each point on the second scale corresponds to a unique point on the first scale and indicates the percent difference between a reference point on the first scale and the unique point on the first scale. The shrinkage device also comprises a first array of lines, each line of the first array corresponding to a unique percent shrinkage, and a second array of lines extending across the first array such that the distance between any two lines of the second array as measured along one of the lines of the first array is inversely proportional to one minus the percent shrinkage corresponding to that line of the first array divided by one hundred.

6 Claims, 2 Drawing Figures

SHRINKAGE COMPENSATED MEASURING DEVICE

FIELD OF THE INVENTION

The present invention relates to measuring devices. More specifically, it relates to measuring devices which compensate for shrinkage.

BACKGROUND OF THE INVENTION

During many fabricating or manufacturing processes, the piece being processed (i.e., the workpiece) shrinks. For example, a piece of porcelain typically shrinks anywhere from 12 to 16 percent during firing in a kiln. To produce a finished piece having specific dimensions, it is important to determine the exact amount the workpiece will shrink during processing and to increase the pre-processing dimensions sufficiently to allow for the determined shrinkage.

Many factors affect the exact amount of shrinkage, including the composition of the material from which the workpiece is fashioned, the size of the workpiece and the conditions under which the workpiece is processed (e.g., temperature, humidity and duration). Consequently, the amount of shrinkage can vary from the workpiece to another and from one process to another. Ideally, there should be some means to determine the exact amount a particular workpiece will shrink during a particular process.

Once the exact amount of shrinkage is determined, this amount can be factored in to the pre-processing dimensions of the workpiece. A highly convenient means to factor in this shrinkage is known in the art as a shrinkage ruler. A shrinkage ruler provides a scale that is calibrated in standard units of measure (e.g., inches or centimeters) but has a distance between successive unit designations sufficiently greater than one standard unit to allow for a specific amount of shrinkage. For example, a 10 percent scale calibrated in inches has a distance of 1-1/9 inches between successive inch designations.

Each shrinkage ruler typically provides several scales, each corresponding to a specific amount of shrinkage, such as 6, 10, 12 or 14 percent. However, unless a particular workpiece actually shrinks during a particular process by the amount specified for one of the scales, the shrinkage ruler provides only a rough approximation of the necessary pre-processing dimensions for the workpiece. For example, if the workpiece actually shrinks $7\frac{1}{2}$ percent, neither the 6 percent scale nor the 10 percent scale on the shrinkage ruler can provide accurate pre-processing dimensions. In many fabricating or manufacturing situations, such rough approximations are not acceptable.

SUMMARY OF THE INVENTION

It is a primary object of the present invention to provide a means for conveniently and precisely determining and allowing for shrinkage.

A more specific object of the present invention is to provide a means for conveniently and precisely determining the percent shrinkage of the linear dimensions of a particular workpiece during a specific fabrication or manufacturing process.

Another specific object of the present invention is to provide a means for creating a shrinkage ruler having a scale that is tailored to any particular amount of shrinkage.

Other objects and advantages of the present invention will become apparent from the following detailed description and the accompanying drawings.

In accordance with the present invention, the foregoing objects are realized by a shrinkage device having a first scale calibrated in units of length, e.g., inches or centimeters, and a second scale calibrated in units of percent shrinkage. Each point on the second scale corresponds to a unique point on the first scale and indicates the percent difference between a selected reference point on the first scale and the unique point on the first scale. By means of these scales, the amount that a particular workpiece will shrink during a particular process can be accurately determined.

The shrinkage device of the present invention further comprises a first array of lines, where each line of the first array corresponds to a unique percent shrinkage, and a second array of lines extending across the first array such that the distance between two successive lines of the second array as measured along any one of the lines of the first array is inversely proportional to one minus the percent shrinkage corresponding to that line of the first array divided by one hundred. By means of these arrays of intersecting lines, a shrinkage ruler allowing for the exact amount of shrinkage determined by the first and second scales can be conveniently fashioned and used to specify the pre-processing dimensions of the workpiece.

DESCRIPTION OF THE PREFERRED EMBODIMENT OF THE INVENTION

Figure 1:
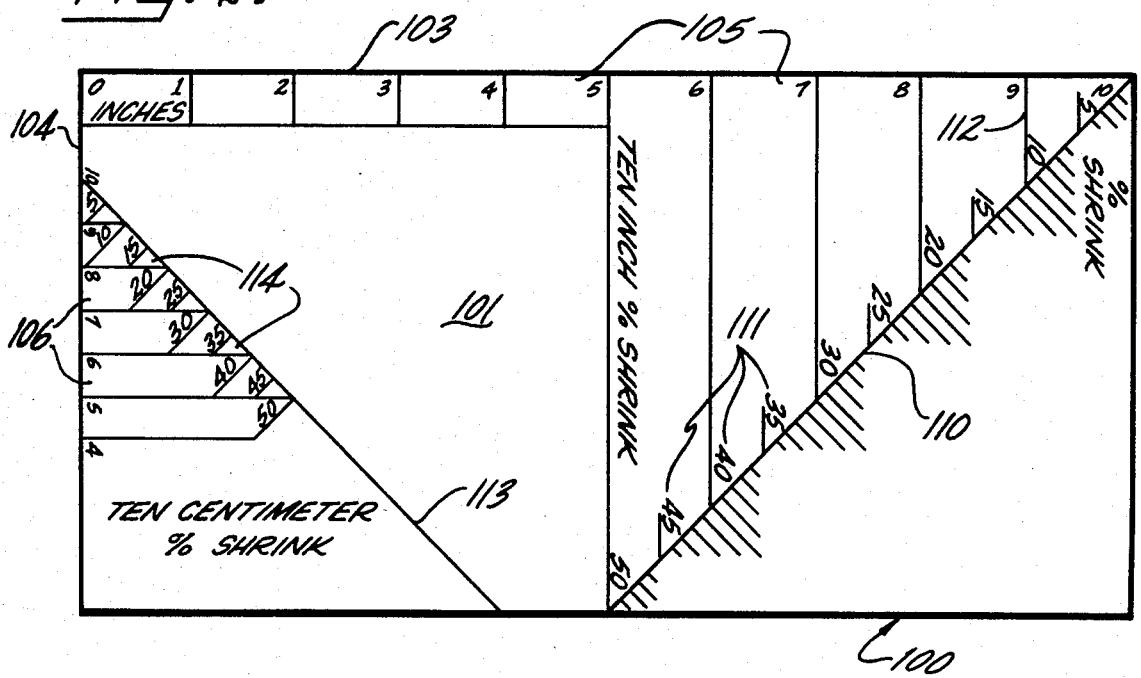
FIG. 1 is a plan view of the front side of a shrinkage device of the present invention and FIG. 2 is a plan view of the back side of a shrinkage device of the present invention.
Figure 2:
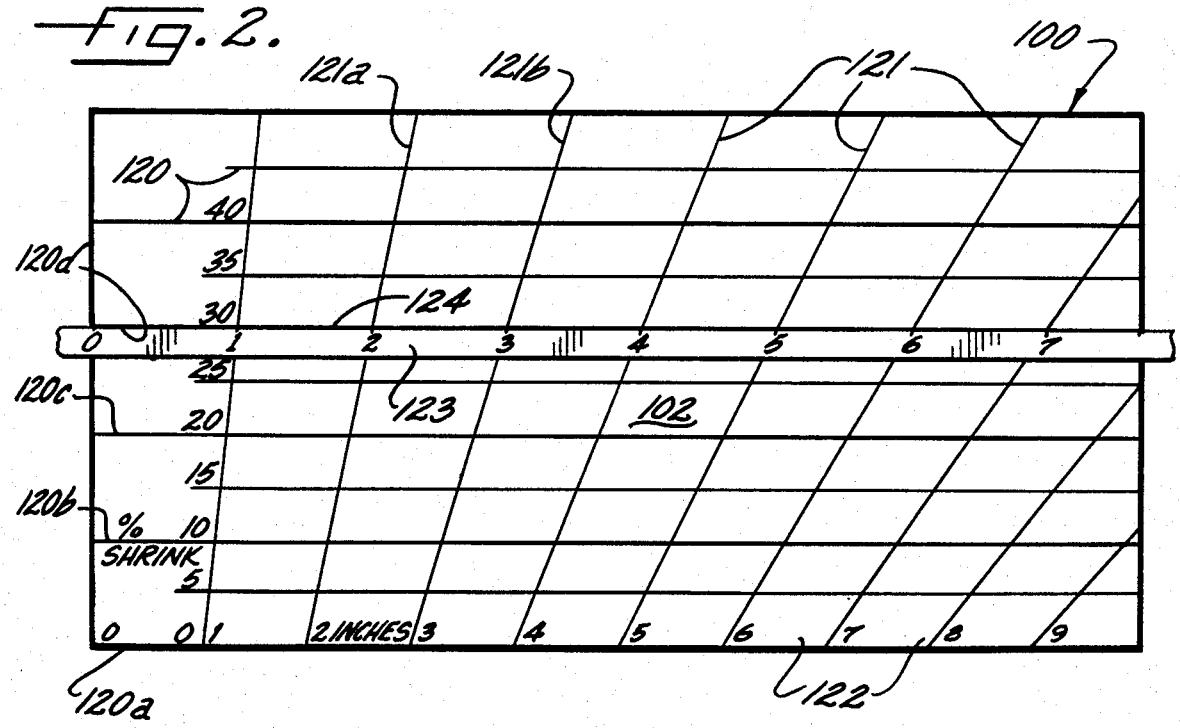

An exemplary device 100 which embodies the present invention comprises a thin rectangular plate fashioned from a plastic or other suitable material and having a front side 101 as shown in FIG. 1 and a back side 102 as shown in FIG. 2. The front side 101 is used to determine the amount that a testpiece of a certain material (e.g., a porcelain ceramic) will shrink during a particular processing operation (e.g., firing in a kiln). The back side 102 is used to create a scale calibrated in standard units of length (e.g., inches) but having a distance between successive unit designations greater than the standard unit by an expansion factor defined according to the determined shrinkage. For a workpiece which is of a similar material to that of the testpiece and is to undergo a similar processing operation, the scale may be used to establish pre-processing dimensions which will shrink during the processing operation to desired post-processing dimensions.

As shown in FIG. 1, the front side 101 of the device 100 has first and second edges 103, 104 comprising first and second scales 105, 106, respectively. In this preferred embodiment, the first scale 105 is calibrated in 10 inches having one inch between successive inch designations, and the second scale 106 is calibrated in 10 centimeters having one centimeter between successive centimeter designations. However, either scale 105, 106 may be calibrated in any number of any units of length having a single unit distance between successive unit designations without departing from the scope of the invention.

A first oblique line 110 extends across the front side 101 at an acute angle to the first edge 103, intersecting the first edge 103 at a reference point on the inch scale 105, which in this preferred embodiment is the 10-inch designation. This first oblique line 110 comprises a scale 111 which is calibrated in percent shrinkage and which relates directly to the inch scale 105. Each point on the percent shrinkage scale 111 corresponds to a unique point on the inch scale 105 and indicates the percent difference, i.e., the percent shrinkage, between the reference point, i.e., ten inches, and the unique point on the inch scale 105. For example, the percent shrinkage scale 111 indicates that nine inches is 10 percent less than 10 inches, as determined by the perpendicular 112 from the nine-inch designation on the inch scale 105 to the percent shrinkage scale 111. A second oblique line 113 similarly extends across the front side 101 at an acute angle to the second edge 104, intersecting the second edge 104 at a reference point on the centimeter scale 106, which in this preferred embodiment is the 10-centimeter designation. This second oblique line 113 also comprises a scale 114 which is calibrated in percent shrinkage and which relates to the centimeter scale 106 just as the percent shrinkage scale 111 along the first oblique line 110 relates to the inch scale 105.

To determine the amount that a workpiece will shrink during a processing operation, e.g., the amount that a certain porcelain will shrink during a particular firing in a kiln, a testpiece is fashioned from the same clay body as the workpiece such that its thickness is approximately equal to the thickness of the workpiece and such that it has at least one 10-inch or 10-centimeter straight edge, whichever dimension most closely corresponds to the linear dimensions of the workpiece. The testpiece is then subjected to the same firing as intended for the workpiece, e.g., the same temperature, humidity, and duration. Afterwards, the straight edge is measured by the appropriate scale 105, 106 and the percent shrinkage is determined from the related percent shrinkage scale 111, 114. For example, if the straight edge of the testpiece measured 10 inches before firing and, after firing, measured eight inches along the inch scale 105, the percent shrinkage, as indicated on the related percent shrinkage scale 111, is 20 percent. Since the amount of shrinkage depends on the composition of the clay body, on the dimensions of the workpiece, and on the conditions of the particular firing, the percent shrinkage of the testpiece provides an extremely accurate estimate of the amount that the workpiece will shrink when it is fired.

As shown in FIG. 2, a first array of parallel reference lines 120 and a second array of skewed lines 121 extend across the back side 102 of the device 100. The reference lines 120 are evenly spaced from one another, and each line 120 uniquely corresponds to a percent shrinkage. The initial reference line 120a, which is coincident with the first edge 103 of the device 100, corresponds to zero percent shrinkage and reference lines 120 progressively farther from the initial reference line 120a correspond to progressively greater percent shrinkages. The initial reference line 120a also comprises a scale 122 calibrated in 10 inches having one inch between successive inch designations. However, the scale 122 may be calibrated in any number of any units of length having a single unit distance between successive unit designations without departing from the scope of the invention.

The skewed lines 121 extend across the parallel reference lines 120, and each skewed line 121 uniquely corresponds to a point on the initial reference line scale 122. Successive skewed lines 121a, 121b diverge from one another such that the distance between them as measured along any of the parallel reference lines 120 is proportionally greater than the one-inch distance between successive inch designations of the initial reference line scale 122 by a factor equal to the reciprocal of [1-(percent shrinkage ÷ 100)]. For example, the distance between successive skewed lines 121a, 121b, as measured along the reference line 120b corresponding to 10 percent shrinkage, is 1-1/9 inches while the distance between successive skewed lines 121a, 121b, as measured along the reference line 120c corresponding to twenty percent shrinkage, is 1¼ inches.

To create a shrinkage ruler having a scale tailored to a particular workpiece and process, the amount that the workpiece will shrink during the process is first determined using the front side 101 of the device 100. Then, a blank tape 123 is laid across the skewed lines 121 with one edge 124 of the tape 123 aligned with the reference line 120 which corresponds to the determined shrinkage. For example, if the amount of shrinkage is found to be 30 percent, the edge 124 of the tape 123 is aligned with the reference line 120d corresponding to 30 percent. The tape 123 is then marked at the intersection of the edge 124 and each skewed line 121 with the inch designation on the initial reference line scale 122 that corresponds to the skewed line 121. The distance between successive "inch" designations on the tape 123 equals the distance between successive skewed lines 121, i.e., proportionally greater than one inch by a factor equal to the reciprocal of [1-(percent shrinkage·100)]. The calibrated tape 123 may then be used to dimension a workpiece in pre-processing "inches" which, during processing, will shrink to standard inches, yielding the desired post-processing dimensions.

While a particular embodiment of the invention has been described above, the invention is not so limited. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

I claim as my invention:

1. A shrinkage device comprising a flat body member, a first scale on the flat body member calibrated in units indicative of length, the scale including an initial point and a reference point spaced from the initial point and each point on the first scale indicative of the distance from that point to the initial point, a second scale on the flat body member calibrated in units indicative of percent shrinkage, each point on the second scale corresponding to a unique point on the first scale wherein a line passing through a point on the first scale and the corresponding point on the second scale is parallel to a line passing through any other point on the first scale and the corresponding point on the second scale, the second scale including a reference point which corresponds to the reference point on the first scale, the distance between the reference point on the second scale and a second point on the second scale being indicative of the percent difference between the distance indicated by the reference point on the first scale and the distance indicated by the point on the first scale to which the second point on the second scale corresponds, a first array of lines on the flat body member, each line of the first array corresponding to a unique percent shrinkage, and a second array of lines on the flat body member intersecting the first array of lines, the distance between two successive lines of the second array as measured along any one line of the first array being inversely proportional to one minus the percent shrinkage corresponding to that one line of the first array divided by one hundred, whereby the percent shrinkage determined from the first and second scales may be compensated for by the distance between successive lines of the second array as measured along the line of the first array corresponding to that percent shrinkage.

2. The shrinkage device of claim 1 wherein the second scale intersects the first scale at the reference point on the first scale, the reference point on the second scale being coincident with the reference point on the first scale.

3. The shrinkage device of claim 1 wherein the first scale is calibrated in inches.

4. The shrinkage device of claim 1 wherein the first scale is calibrated in centimeters.

5. The shrinkage device of claim 1 wherein the lines of the first array are parallel.

6. The shrinkage device of claim 1 wherein the distance between two successive lines of the second array as measured along the line of the first array corresponding to zero percent shrinkage is one inch.

* * * * *